ial manner on the chassis of the machine, for controlling the position or attitude of said element or blade with respect to a reference line, and independently of chassis movement.

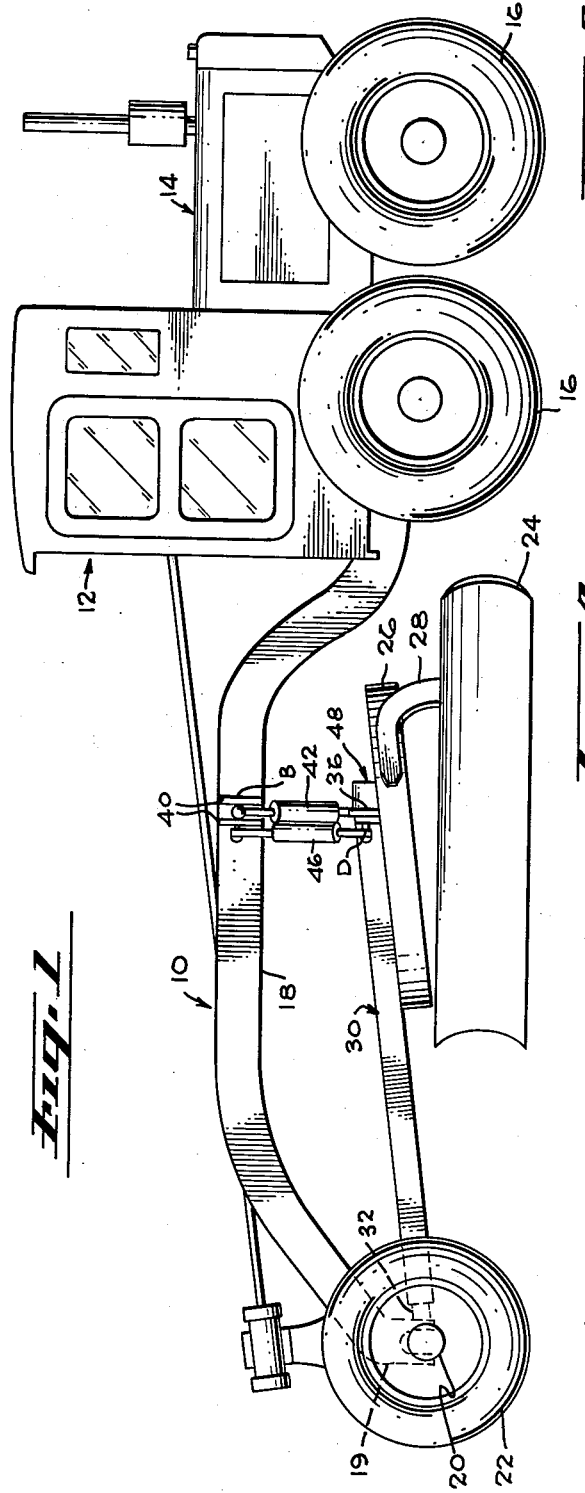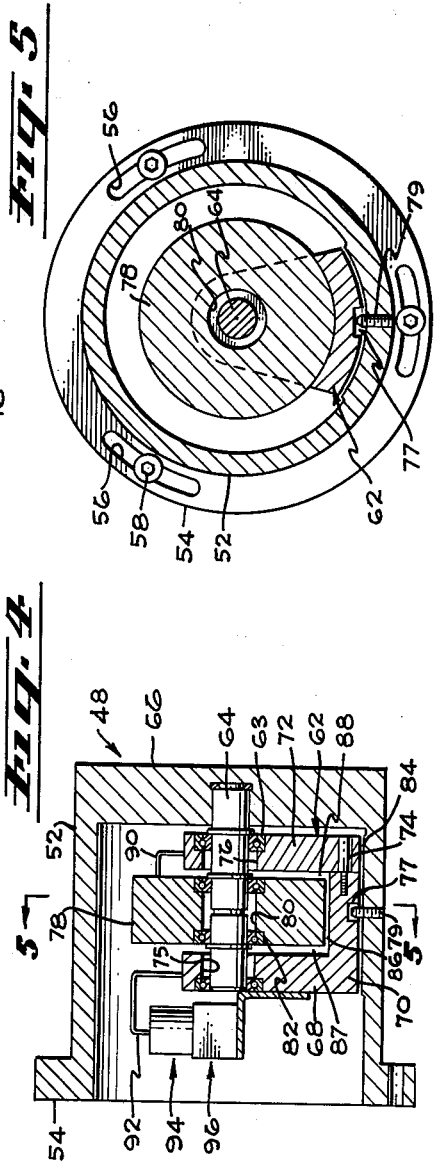

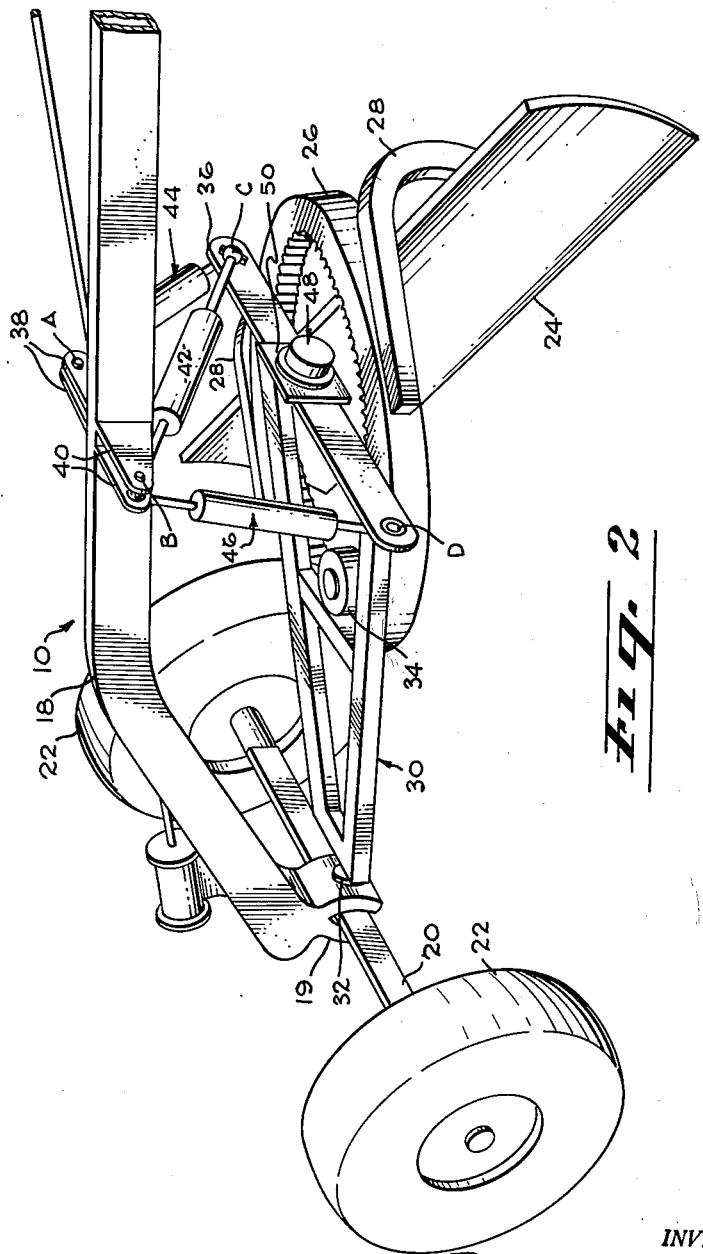

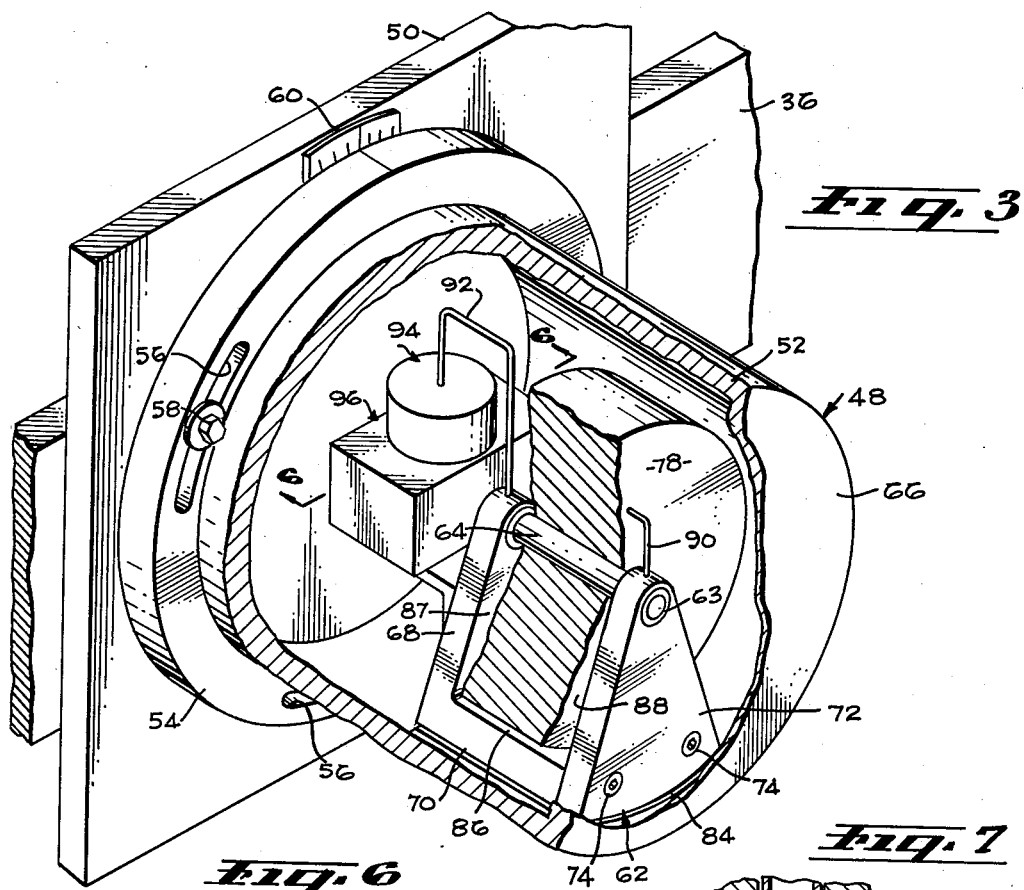
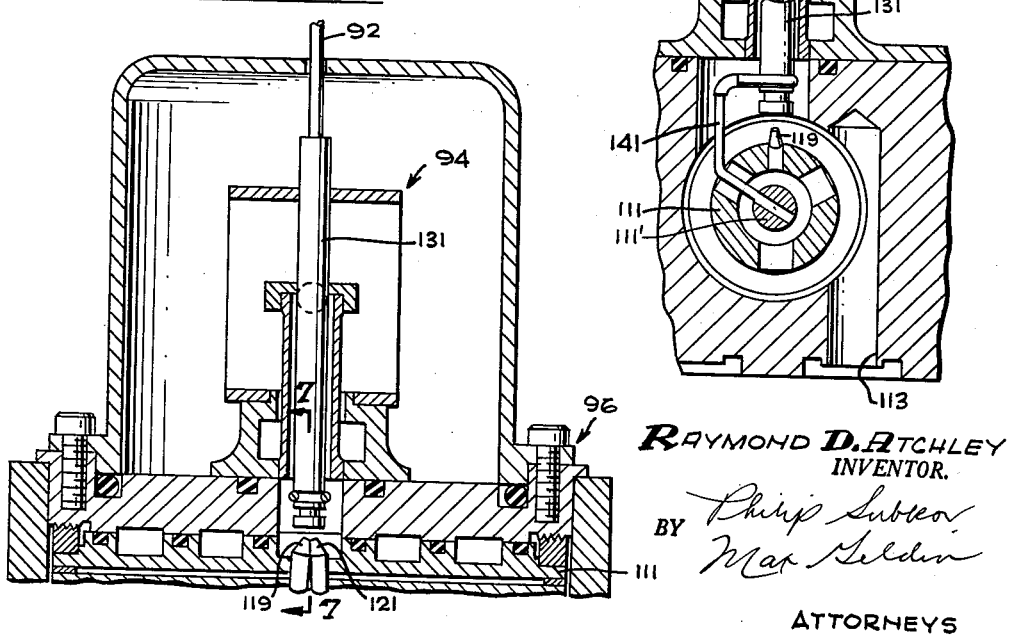

United States Patent Office 3,094,796
Patented June 25, 1963

3,094,796
APPARATUS FOR CONTROLLING THE ATTITUDE OF TRACTOR MOUNTED EQUIPMENT
Raymond D. Atchley, Los Angeles, Calif., assignor to American Brake Shoe Company, New York, N.Y., a corporation of Delaware
Filed June 19, 1961, Ser. No. 127,423
19 Claims. (Cl. 37—156)

This invention relates to a novel apparatus incorporating means for controlling the motion of a movable element of the apparatus. The invention in a preferred embodiment relates to machines, for example tractors or road graders, having a sensing device combined with a movable element thereof, such as a scraper blade, which is mounted in an articulated manner on the chassis of the machine, for controlling the position or attitude of said element or blade with respect to a reference line, and independently of chassis movement.

Prior art devices of various designs have been provided for controlling the level of the entire chassis of machines such as tractors and agricultural machinery, with respect to the ground or terrain over which the machine is passing. However, in the prior art systems of this type, the chassis must be specially designed for proper combination with and actuation of the compensating structure of the level controller. This renders the prior art systems complicated and expensive, and applicable only for machines particularly designed for use of such controllers. Further, in such prior art systems for controlling the attitude of the entire chassis, the controller must be of relatively rugged construction, and due to the relatively large mass of the chassis such prior art systems have a tendency to be sluggish in their response.

It is an object of this invention to design a system for maintaining an element of a machine such as the earth levelling blade of a conventional tractor or road grader, in a predetermined position with respect to the horizontal and independently of the displacement of the chassis, with respect to the horizontal, and substantially without redesigning the tractor structure.

A further object of the invention is the design of a system incorporating a controller in operative association with any desired element of a machine, the attitude of which it is desired to control, said element being mounted on the chassis, but movable with respect thereto to maintain a desired attitude for the element with respect to a horizontal or vertical reference.

A still further object is to provide a controller in combination with an element such as a blade, harrow or discing element, of a tractor or earth working machine, which element is articulated in one or more planes with respect to the chassis, for controlling the attitude of such element with respect to the chassis.

Still another object of the invention is to provide a system of the aforementioned nature, which is responsive over an extended frequency range to displacements relative to an inertial reference.

Other objects and advantages will appear hereinafter.

According to the invention, a system is provided including a controller connected to or mounted on a movable element of a conventional machine such as the scraper blade of a conventional road grader, and which is articulated with respect to the chassis, without reorganization or redesign of the tractor or road grader, to maintain such element in a preselected position with respect to a reference line, and independently of the motion of the chassis with respect to such reference line. In this manner, for example, the angle of the scraper blade with respect to a preselected grade angle, can be maintained substantially constant regardless of vibrations or oscillations of the chassis or vehicle frame. In this system, the controller does not change the attitude of the vehicle chassis, but only the attitude of the element on which it is mounted.

Instead of mounting the controller on a scraper blade of a road grader, such controller can, if desired, be mounted on elements of other devices, such as the harrow or disc elements connected to the chassis of road building and agricultural equipment, to control the level thereof, irrespective of the vibrations of the chassis. In the road grader application, the scraper blade on which my controller is mounted, can be articulated with respect to the chassis in one or more planes, and one or more of my controllers can be mounted at various angles of the blade, to sense deviations of the blade in one or more of said planes from a preset angle. In a preferred embodiment, the controlled element, e.g. the scraper blade, is articulated with respect to the chassis in one plane, e.g. in a transverse vertical plane, and the controller is mounted to sense deviations of the blade from a preset reference line in such transverse vertical plane.

According to one embodiment of the invention, a sensing device or control means is employed connected to or mounted on an element which has an articulated connection to the chassis, and which is movable with respect to the chassis, such means being responsive to any change in attitude, of the element, in a preselected plane, e.g. in a transverse vertical plane, in combination with a servo system which operates on said articulated member, and corrects any error, i.e. any deviation of the element, from a preset angle as sensed by the control means, and maintains such element in the desired preset position. More specifically, the sensing device is so mounted, in combination with an appropriate fluid powered servo control arrangement operatively associated with said articulated member, that such device is capable of sensing deviations of position from a preset reference of, for example, a road grader scraper blade, and is further capable of transmitting signal inputs to the servo system which inputs generate a force which is proportional to said deviations and immediately and continuously by means of the servo control arrangement producing a correction force so as to control the articulated connection between the chassis frame and blade, to maintain the scraper blade in angular orientation relative to a roadbed substantially fixed regardless of oscillations and disturbances introduced to the road grader vehicle frame.

In one form of the invention a pendulum is employed as a means to sense the displacement of the element, that is deviations of such movable element, e.g. scraper blade, from a preset position thereof. A connection, e.g. a resilient connection, can be provided between the pendulum and the servo valve of a servo control system, which actuates the aforementioned articulated member. In order to improve the performance of the system viscous damping is preferably employed in the pendulum. This may be provided by causing the oscillations of the pendulum to produce a relative movement of the pendulum with respect to a liquid. A typical arrangement involves locating the pendulum in an appropriate housing structure and the provision of clearances between the pendulum and structural housing. The housing is partially filled with a damping fluid having suitable viscosity. Therefore, as the pendulum is displaced relative to the housing, the pendulum is damped.

One form of controller or motion sensing device which can be employed according to the invention comprises a pendulum and a separate non-pendulous inertial mass, e.g. in the form of a flywheel, mounted adjacent the pendulum on a common axis, but movable independently of each other. A resilient or yieldable connection, e.g. in the form of a spring, is provided between the pendulum and the separate non-pendulous inertial mass, and a source of viscous damping is provided between the pendulum and inertial mass, such source being, for example, in the form of a narrow oil filled chamber between the pendulum and the separate inertial mass, which is accomplished by immersing the pendulum and non-pendulous inertial mass in a damping oil. Another connection, e.g. in the form of a spring, is provided between the pendulum and the servo valve, e.g. between the pendulum and the pilot stage of a two stage servo valve such as, for example, that described in Atchley Patent No. 2,884,907.

The above dynamic combination including the non-pendulous inertial mass and spring connection between such mass and the pendulum functions to feed energy into the pendulum in a properly phased relation such that the pendulum amplitude in response to a vibration or disturbance remains substantially unaltered, but the pendulum is made responsive to intermediate or higher frequencies of vibration than in the absence of the aforementioned dynamic combination.

The pendulum device preferably provides a signal of sufficient amplitude at such frequencies and phase relation to the movement of the member that the signal is an indication of the amplitude of oscillation of the frame member, blade or other element on which it is mounted, and is in phase therewith.

By way of illustration only, it is pointed out that a simple damped pendulum as a motion sensing device of the size and configuration useable in a typical road grader is capable of providing properly phased corrective inputs to a servo control arrangement through a frequency spectrum having a maximum frequency of the order of about ⅓ to ½ cycle per second. However, the same damped pendulum in combination with the above mentioned non-pendulous inertial mass and spring connection to the pendulum, provides a reasonably flat and useable pendulum amplitude throughout an extended frequency range up to over 4 cycles per second, which represents an approximate upper limit of vehicle frame and tire combination natural frequency of oscillation, in, for example, a road grader.

Any suitable form of servo valve can be employed in the servo system of the invention, in operative association with the signal generating device, e.g. the pendulum controllers described above. Thus, the pendulum controller is connected to the servo valve so that the displacement of the pendulum generates a force which is the signal input to the servo valve. Preferably, however, a more sensitive two stage servo valve is employed, with a resilient connection, e.g. in the form of a spring, between the pendulum and the first stage of such valve. Where the two stage servo valve is used, it is preferable to employ force feedback between the first and second stages to obtain high sensitivity, e.g. by means of a spring connection, as shown in Atchley Patent 2,884,907. One advantage of the use of a two stage valve is to avoid contamination problems. Such two stage valves, however, have other advantages. Thus, for example, the first stage of these valves is substantially frictionless because of low force levels at low angular displacements, and has low inertia. Other types of two stage valves such as the flapper valve shown in Patent No. 2,625,136 may be used. The displacement of the pendulum causes a flexure of the spring which then generates a displacement force upon the ejector jet pipe of the Atchley valve or the plate of the valve of Patent No. 2,934,765.

The invention will be understood more clearly by reference to the description below of certain embodiments of the invention taken in connection with the accompanying drawings, wherein:

FIG. 1 is a side view of a road grader on which a controller is mounted according to the invention;

FIG. 2 shows a perspective view of a portion of the road grader of FIG. 1, showing the controller mounted to control the attitude of the scraper blade in a substantially transverse vertical plane;

FIG. 3 is a perspective of one form of controller which can be employed, with the case broken away to show the mechanism of the controller;

FIG. 4 is a transverse section through the controller mechanism;

FIG. 5 is a section taken on line 5—5 of FIG. 4;

FIG. 6 shows a partial vertical section through a two stage servo valve which is resiliently connected to the pendulum of the controller, taken on line 6—6 of FIG. 3;

FIG. 7 is a detail of a section taken on line 7—7 of FIG. 6; and

Figure 8:
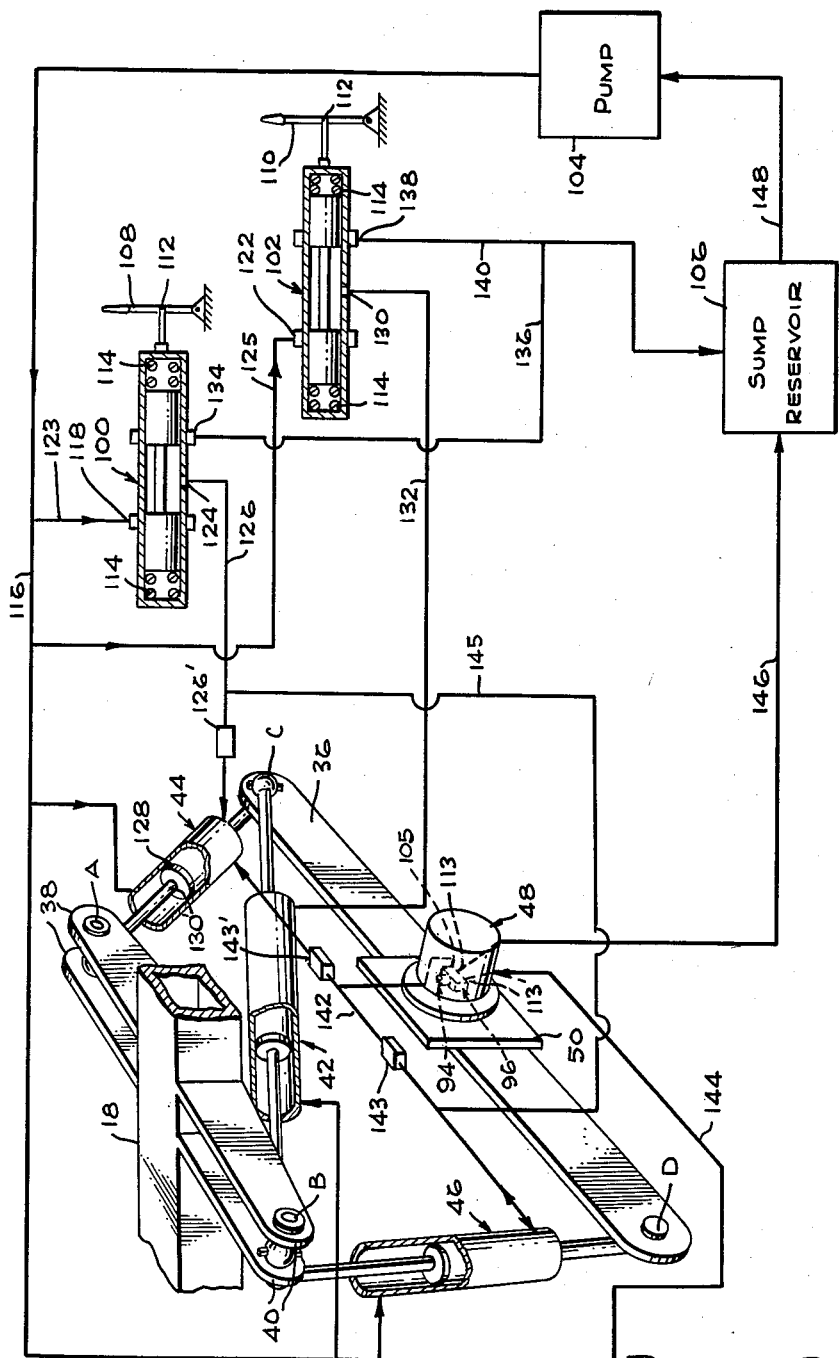
FIG. 8 is a schematic representation of a hydraulic system including a servo valve of the type shown in FIGS. 6 and 7, and the hydraulic actuators for adjusting the level or attitude of the scraper blade.

Referring to FIGS. 1 and 2 of the drawing, the road scraper assembly represented generally by the numeral 10, is attached to a motor patrol assembly, generally indicated by numeral 12, both of substantially conventional design. The motor patrol is powered by a motor 14, and is mounted on wheels 16 of conventional type. The motor patrol has attached in front thereof a chassis structural member 18, which is forked at its forward end 19 over the axle 20 carrying wheels 22.

A scraper blade 24 is fixedly attached to a ring gear 26 by means of two goose neck shaped attach members 28. The ring gear 26 together with the attached scraper blade 24 is mounted on and receives its tractive force through an A-frame member 30 connected by a swivel joint 32 to the lower forked end 19 of chassis member 18. The ring gear 26 is rotatably mounted on the A-frame member 30, its angular orientation in the plane of the A-frame being established and set in a desired predetermined position by the ring gear drive 34 and a gear box arrangement (not shown).

For any preset angular orientation of the scraper blade 24 relative to A-frame 30, the angular orientation of scraper blade 24 projected in a tranverse vertical plane passing through the longitudinal axis of the vehicle frame, is established by the compound four-bar linkage consisting of structural cross member 36, chassis attach point A located on outboard structural members 38, chassis attach point B located on outboard structural members 40, hydraulic actuator 42 connecting points B and C by universal ball joint connections, point C being located at one end of cross member 36 diagonally opposite point B, actuator 44 connecting points A and C by universal ball joint connections and actuator 46 connecting points B and D by universal ball joint connections, point D being located at one end of cross member 36 opposite point C. The sensing device or controller 48 is positioned on pad 50 mounted vertically on cross member 36 preferably approximately centrally thereon. It will be seen that actuators 42, 44 and 46 provide an articulated system connecting the chassis frame and scraper blade 24 supported on the A-frame 30.

As is evident from FIG. 2, the angular orientation of the scraper blade 24 projected in a transverse vertical plane with respect to the central longitudinal axis of the vehicle frame, together with the lateral displacement of blade 24 relative to such central vehicle axis, is established by adjusting the extension of each of the three hydraulic actuators 42, 44 and 46. Each actuator constitutes an extensible link between the respective pairs of attach points indicated in FIG. 2. The degree of extension of each actuator can be controlled by means of a manually operated valving system illustrated in FIG. 8, and located in the vehicle cab and controlled by the road grader operator.

Referring again to FIG. 2, it is evident that actuator 42, constituting an adjustable extensible link between points B and C, serves primarily to establish the lateral position of the blade suspension system relative to the vehicle longitudinal center line. With this lateral positioning established, actuators 44 and 46 constituting extensible links between points A and C, and B and D respectively, are controlled by manually operated valving means shown in FIG. 8, located in the vehicle cab. Simultaneous adjustment of the position of point C relative to point A through operation of actuator 44 and adjustment of point D relative to point B through operation of actuator 46, subsequent to the adjustment of point C relative to point B by operation of actuator 42, completely establishes the position of scraper blade 24 relative to the roadbed for any preselected angular orientation of the ring gear 26 with respect to A-frame 30.

With the desired geometric relationship of scraper blade 24 established as above described relative to the roadbed, operation of the sensing device or controller 48 thereafter is effective in maintaining the angular orientation of the scraper blade 24 in a transverse vertical plane substantially fixed, regardless of oscillations of the vehicle frame 18 and blade supporting structure, which oscillations are generated by roadbed irregularities introduced into the vehicle frame structure through elasticity of the tires on wheels 16 and 22.

As shown in FIGS. 3, 4 and 5, the controller 48 is housed in a generally cylindrical housing structure 52 provided with an integral flange 54 for mounting of the device on pad 50. Flange 54 is provided with a series of elongated mounting bolt clearance slots 56 so that the angular orientation of the sensing device is adjustable on pad 50 and thereafter locked by means of locking bolts 58. An indicator 60 shows the angular orientation of the device on the pad 50.

The output element of the sensing device comprises a pendulum 62 rotatably mounted by means of ball bearings 63 upon stationary pin 64 fixedly mounted and secured to housing outboard end plate 66. Said pendulum 62 comprises inboard suspension member 68 integral with a massive pendulous element 70, and outboard suspension member 72. Screws 74 secure outboard suspension member 72 to pendulous element 70. Both the inboard and outboard suspension members 68 and 72 are provided with through bores 75 and 76 by means of which the pendulum is pivotally mounted upon stationary pin 64. A recess 77 is formed in the lower surface of the pendulous element 70 and the end of a screw 79 mounted in the housing 52 is received in the recess 77, permitting a limited amount of angular movement of the pendulum 62 in opposite directions.

It will be seen that for any desired initial angular displacement of blade 24 with respect to the horizontal, by first loosening bolts 58, the flange 54 of the controller 48 can be rotated to such desired angular displacement as shown by indicator 60, so as to place the pendulum 62 in a true central vertical position with respect to gravity, with the screw 79 approximately centrally positioned in the recess 77, as seen in FIG. 5. Any angular deviation of the blade 24 from this preset angular position of the blade, will produce an oscillation of the pendulum and will cause operation of one or both of the actuators 44 and 46, to correct such deviation, as described more fully below.

Also pivotally mounted upon stationary pin 64 and located approximately equally spaced between pendulum inboard suspension member 68 and outboard suspension member 72 is a non-pendulous inertial mass or flywheel 78. The flywheel has a bore 80 therein to receive pin 64, and the flywheel is rotatably mounted on the pin by means of ball bearings 82.

A clearance 84 is provided between outer housing 52 and the outer periphery of pendulous element 70, and a second clearance 86 between the inner periphery of pendulous element 70 and the outer cylindrical surface of flywheel 78. Also, equal clearances 87 and 88 exist between the flat side surfaces of flywheel 78 and the inner flat surfaces of pendulum suspension members 68 and 72.

When the device is operational the cavity within outer housing 52 in which is mounted the sensing element is partially filled, e.g. about one third full, with a viscous damping fluid. Thus, clearances 84 and 86 are substantially full of fluid, and clearances 87 and 88 are at least partially filled with fluid. Therefore, damping of the pendulum 62 relative to outer housing 52, and damping of the flywheel 78 relative to the pendulum 62 result.

Flywheel 78 is resiliently connected to pendulum outer suspension member 72 by means of spring 90.

It will be seen that the narrow oil filled or partially oil filled spaces 84, 87 and 88, between the pendulum 62 and the inertial mass or flywheel 78, provides a source of shear damping between the pendulum and housing 52, and between the pendulum and flywheel. It will also be noted that the spring 90 connected between the flywheel 78 and the pendulum 62 provides an elastic coupling between the pendulum degree of freedom and the flywheel degree of freedom. The stiffness of spring 90 and the amount of shear damping are selected so that during oscillation of the pendulum at intermediate frequencies of say between 1 and 5 cycles per second, the inertial mass of the non-pendulous flywheel functions to feed energy into the pendulum in a properly phased relation so that the pendulum responds to frequencies within the above noted frequency range.

Pendulum inner suspension member 68 is resiliently connected through spring coupling element 92 to the pilot stage, indicated generally at 94, of a two stage servo valve, indicated generally at 96 and of a type shown in FIGS. 6 and 7, and more fully described in Atchley Patent 2,884,907.

Movement of the jet pipe 131 of the first stage of such valve in response to a signal force transmitted by the spring 92 from the controller 48, will cause the fluid pressure in one of the receptor jets 119 or 121 of the valve to be greater than the pressure in the other receptor jet and producing a corresponding pressure difference in the chambers in the sleeve 111 at opposite ends of the spool 111' slidably positioned in such sleeve of the valve, to cause displacement of the spool 111' in one direction or the other. Such displacement of the spool 111' valves fluid at varying pressure through a variable orifice of such valve and then through a communicating bore of the valve indicated at 105 in FIG. 8, for operation of one of the actuators, e.g. 44 or 46, as described hereinafter. The displacement of the spool 111' of the valve imposes a spring force on jet pipe 131 by means of spring 141, proportional to displacement of the spool, to return the pipe 131 to its neutral central position shown in FIG. 6, as more fully described in Patent No. 2,884,907, at which place the pressure in the receptor jets 119 and 121 is again equal, and further displacement of spool 111' of the valve is interrupted. The spring 141 thus acts as a force feedback to null out and balance the force of the signal causing the initial displacement. During operation, there is a continuous flow of supply fluid through ejector jet pipe 131 and receptor jets 119 and 121 via valve inlet bore 113' and outlet bore 113, as illustrated in FIG. 8.

The complete structure as well as the operation of such valve will be made clear by further reference to Patent 2,884,907, which is incorporated herein by reference.

Operation is such that angular displacement of the pendulum 62 relative to the outer housing 52 results in a force proportional to said displacement being transmitted through spring coupling element 92, to jet pipe 131 of the pilot stage 94 of the valve of FIGS. 6 and 7. The slidable spool 111' of the valve is thereupon displaced proportionally to the then existing force transmitted through spring element 92 into pilot stage 94.

It will be recognized that the force transmitted through spring coupling member 92 is proportional to pendulum angular displacement relative to housing 52, since valve body housing 96 and valve pilot stage 94 mounted thereon are fixedly secured to housing 52. Resulting displacement of the second stage valve spool 111' in valve 96 can be arranged to valve fluid to either or both of actuators 44 and/or 46 depending on the pendulum position, for scraper blade position adjustment in a transverse vertical plane through the blade, as will be described in greater detail below.

The hydraulic system for operation of the actuators 44 and 46 in response to actuation of the sensing means or servo valve 96 is illustrated in FIG. 8 of the drawing. Numerals 100 and 102 indicate manually operable control valves which are mounted in the vehicle cab for operation by the vehicle operator. Numeral 104 represents a pump for supplying high pressure hydraulic fluid, and 106 represents a sump reservoir. Valves 100 and 102 are each spring-biased three-way valves, normally in the position shown in FIG. 8. Each of these valves is manually operable to the right or left, viewing FIG. 8, by actuation of levers 108 and 110, about their respective pivot points 112, against the action of the springs 114. It will be seen that valve 100 is arranged to operate actuator 44, and valve 102 is arranged to operate actuator 42. The three-way servo valve 96 of the type described above and shown in Atchley Patent No. 2,884,907, within housing 52 of the controller 48, is arranged to operate the actuator 46.

Pump 104 is in communication via line 116 with the upper portion of the cylinders of each of actuators 44, 42 and 46, providing high pressure supply fluid thereto. Line 116 is in communication with inlet port 118 of valve 100 via line 123, and with inlet port 122 of valve 102, via line 125. When valve 100 is actuated to the left in FIG. 8, against the action of springs 114 thereof, inlet port 118 of valve 100 is in communication with outlet port 124 of valve 100, and high pressure fluid will be pumped via line 126 and valve 126' into the lower portion of the cylinder of actuator 44. Since the area of the lower face of the piston 128 in each of the actuators is greater than the area of the upper face of such pistons, due to the piston rod 130', the communication of pump pressure with the lower portion of the cylinder of actuator 44 will cause an extension of the actuator 44, since piston 128 therein is fixed.

Likewise, when valve 102 is actuated to the left in FIG. 8, inlet port 122 of valve 102 is in comunication with outlet port 130 of valve 102, and high pressure fluid will be pumped via line 132 into the lower portion of the cylinder of actuator 42, causing an extension thereof.

On the other hand, actuation of valve 100 to the right in FIG. 8, places port 124 in communication with port 134, and pressure fluid can be drained from the lower portion of the cylinder of actuator 44 to sump 106 via lines 126, 136 and 140, causing a contraction or shortening of actuator 44. Similarly, operation of valve 102 to the right in FIG. 8 places port 130 of valve 102 in communication with outlet port 138, and pressure fluid can be drained from the lower end of the cylinder of actuator 42 to sump 106 via lines 132 and 140, causing contraction of actuator 42.

The bore of the servo valve 96 indicated at 105 in FIG. 8 is connected to the lower portion of the cylinder of actuator 46, via line 142 and valve 143, with valve 143' being closed. The bore 113' of the servo valve is connected to receive high pressure supply fluid via lines 116 and 144, and bore 113 of the servo valve 96 is connected via line 146 to sump 106, which is in turn connected via line 148 to the inlet end of pump 104. Hence it is seen that servo valve 96 in the embodiment hereof, is a three port valve, two of the ports 113 and 113' being connected to the reservoir 106 and to high pressure supply line 116 for circulation of fluid through the jet pipe 131 and receptor jets 119 and 121 for actuation of the sliding spool 111' in the second stage of the valve, and the third port 105 being connected to the actuator 46 for fluid flow to and from such actuator for operation thereof in response to the signals imparted to jet pipe 131 via spring 92 by operation of the controller 48.

In the arrangement illustrated in FIG. 8, it is thus seen that actuators 42 and 44 are preset by the vehicle operator and that actuator 46 is operated by the servo valve 96, in response to the actuation of the controller 48. That is, for example, valve 100 can be moved to the left in FIG. 8, to extend the actuator 44, or to the right to contract such actuator, so as to obtain the desired initial length thereof, and the lever 108 is then released to return the valve 100 to its normal position shown in FIG. 8, and to lock the valve and actuator 44 in such preset position, and the same operation is applied to valve 102, to obtain the desired length of actuator 42, and to then lock valve 102 and actuator 42 in the desired preset position.

If desired, the hydraulic system of FIG. 8 can be modified so that valve 100 is arranged to operate actuator 46 instead of 44, by closing valve 126' and valve 143, so as to provide communication between port 124 of valve 100 and the lower portion of actuator 46 via lines 126, 145 and 142, and opening valve 143' to permit fluid communication in both directions between port 105 of the servo valve and the lower portion of actuator 44.

Any angular displacement of the scraper blade 24 in a transverse substantially vertical plane, which result from vibrations due to passage of the wheels 16 and 22 over rough or uneven terrain, produces actuation of the controller 48, and a corresponding response of the servo valve 96, to thus valve hydraulic fluid to the actuator 44, or alternatively 46, to maintain the A-frame 30 and the scraper blade 24 connected thereto in the predetermined position, with respect to the chassis member 18. It will be noted particularly that the controller 48 is mounted directly or indirectly on the element which it is desired to control, that is, for example, the scraper blade 24, and not on the chassis structure 18, and no special machine structure is required, but rather, according to the invention, the controller can be mounted on any element of any conventional machine whose oscillations from a preset position, are to be controlled, without redesigning such machine. Although in the embodiment shown in FIG. 2, the controller 48 is shown mounted on the A-frame 30 which in turn is connected to the blade 24 whose displacement is sought to be controlled, through members 28, this is done for convenience, and such device 48 alternatively, if desired, can be mounted directly on the scraper blade 24.

Although I have disclosed a particular design of controller, it will be understood that the instant invention encompasses the combination of any motion sensing means or controller mounted on an element of any machine, other than the chassis of such machine itself, to control the attitude of the element from deviations thereof in a predetermined plane. As another feature, the invention is intended to encompass the combination of a signal source in the form of a motion sensing means or controller mounted directly or indirectly on an oscillatable element, and which is responsive to any change in attitude of said element from a preset position in a predetermined plane, with a servo system which corrects errors as result of displacement of such element from said preset position, and maintains such element in said preset position, such controller serving as a signal source for actuation of a control valve forming an element of such servo system.

Thus, for example, in place of the specific controller 48 described above and shown in FIGS. 3 to 5 of the drawings, I can employ a controller of the same structure as 48, except that the inertial mass or flywheel 78 and the spring connection 90 between the flywheel and pendulum 62, are omitted, thus providing a simple damped pendulum as sensing means.

While I have described particular embodiments of my invention for the purpose of illustration, it should be understood that various modifications and adaptations thereof may be made within the spirit of the invention as set forth in the appended claims.

I claim:

1. A vehicle-mounted road grader comprising a chassis, a road surfacing element mounted on said chassis for angular movement in a horizontal and in a vertical plane, means to adjust the angular position of said element in a horizontal and in a vertical plane transverse to the longitudinal axis of such chassis, a pendulum, a pendulum pivot, a pendulum pivot mounting, mounted on said chassis for angular movement about the axis of said pendulum pivot, responsive to the angular displacement of said element in said vertical plane, means responsive to variations in angular displacement of said pendulum mounting about said pendulum pivot axis, said means including a valve mounted on said chassis for angular displacement about said pendulum axis responsive to the said angular displacement of said element in said vertical plane, a valve member, force transmitting means between said pendulum and said valve member for exerting on said valve member a force responsive to the said variation in angular displacement of said element, a fluid-actuated actuator mounted on said chassis and connected to said element to adjust the angular position of said element in said vertical plane, a fluid pressure source connection connected to said actuator, said valve valving fluid to said actuator through said fluid pressure source, said actuator opposing the angular displacement of said element.

2. In the road grader of claim 1, means for independently adjusting the angular position of said valve about said pendulum pivot axis and means to lock said valve in said angular position.

3. In the road grader of claim 1, said valve and valve member comprising a spool movably mounted in said valve, ports in said valve controlled by said spool for valving fluid to and from said actuator, a pilot valve containing a pilot valve member, said pilot valve valving fluid to said spool to establish a pressure difference across the ends of said spool and to move said spool to open and close said ports, said force-transmitting connection between said pendulum and valve member being a flexible connection between said pendulum and said pilot valve member.

4. In the road grader of claim 3, a force feedback connection between said pilot valve member and said spool.

5. In the road grader of claim 3, means for independently adjusting the angular position of said pilot valve about said pendulum pivot axis and means to lock said pilot valve in said angular position, said pilot valve member actuable to and from said angularly adjusted position on angular displacement of said element.

6. In the combination of claim 5, a force feedback connection between said pilot valve member and said spool.

7. In the road grader of claim 2, said valve and valve member comprising a sleeve, a spool slideably positioned in said sleeve, said pilot valve and pilot valve member comprising a pair of stationary receptor jets, one of said jets in communication with said sleeve at one end of said spool and the other of said jets in fluid communication with said sleeve at the other end of said spool, a movable ejector jet pipe in fluid communication with the stationary receptor jets, said flexible connection between said pendulum and said pilot valve member being a flexible connection between said pendulum and said movable ejector jet pipe.

8. In the road grader of claim 7, a force feedback connection between said spool and said movable ejector jet pipe.

9. In the road grader of claim 7, an independent means for adjusting the angular position of said ejector jet and said receptor jets and said sleeve and spool about said pendulum pivot axis, and means to lock them in said angularly adjusted position, said pilot valve member actuable to and from said angularly adjusted position on angular displacement of said element.

10. A vehicle-mounted road grader comprising a chassis, a road surfacing element, a frame mounted on said chassis, said element mounted on said frame, an articulated mounting for said frame on said chassis, means to adjust said frame and element in a horizontal and in a vertical plane transverse to the longitudinal axis of said chassis, said means including a fluid-actuated actuator connected to said frame, a fluid connection to said actuator, and a valve mounted on said frame in said fluid connection to valve fluid to actuate said actuator, said valve including a valve member to control the passage of fluid to said actuator, a pendulum and a pendulum pivot, a pendulum pivot mounting on said frame and angularly displaceable on said frame about said pendulum pivot axis, a flexible connection between said valve member and said pendulum for movement of said valve member with a force responsive to the angular displacement of said element about said pivot axis, said actuator moving said frame to oppose variations in angular displacement of said element.

11. In the road grader of claim 10, means for independently adjusting the angular position of said valve about the said pivot axis and means to lock said valve in said angularly adjusted position, said pilot valve member actuable to and from said angularly adjusted position on angular displacement of said element.

12. In the road grader of claim 10, said valve and valve member comprising a sleeve, a spool movably mounted in said sleeve, ports in said sleeve, one of said ports connected to the fluid pressure source, another port connected to said actuator, passageways connected to said fluid pressure source and to said sleeve on both ends of said spool, a pilot valve containing a pilot valve member, positioned in said passageways valving fluid to the ends of said spool, to establish a pressure difference across the ends of said spool to open and close said ports, said flexible connection between said pendulum and said pilot valve member being a flexible connection between said pendulum and said pilot valve member.

13. In the road grader of claim 12, means for independently adjusting the position of said pilot valve member, sleeve and spool about said pivot axis and means to lock said pilot valve member sleeve and spool in said angularly adjusted position, said pilot valve member actuable to and from said angularly adjusted position on angular displacement of said element.

14. In the road grader of claim 12, a force feedback connection between said spool and said pilot valve member.

15. In the road grader of claim 14, means for independently adjusting the angular position of said pilot valve and said spool about said pivot axis and means for locking said pilot valve member, sleeve and spool in said angularly adjusted position, said pilot valve member actuable to and from said adjusted position on angular displacement of said element.

16. In the road grader of claim 10, said valve comprising a sleeve, a spool slideably positioned in said sleeve, a pair of stationary receptor jets, one of said jets in communication with said sleeve at one end of said spool and the other of said jets in fluid communication with said sleeve at the other end of said spool, and a movable ejector jet pipe in fluid communication with said receptor jets, and means for valving fluid from the interior of said sleeve in response to the displacement of said spool, said flexible connection between said pendulum and said pilot valve member being a spring connected to said jet pipe.

17. In the road grader of claim 16, a force feedback connection between said spool and said ejector jet pipe.

18. In the road grader of claim 16, said ejector jet pipe, receptor jets, sleeve and spool mounted on said frame, independent means for adjusting the angular position of said ejector jet pipe, receptor jets, sleeve on said frame about said pendulum pivot axis, and means for locking the same in said adjusted position, said ejector jet pipe being movable between said receptor jets responsive to the angular displacement of said element.

19. In the road grader of claim 18, a force feedback connection between said spool and said ejector jet pipe.

References Cited in the file of this patent

UNITED STATES PATENTS

| | | |
|---|---|---|
| 2,491,275 | Millikin | Dec. 13, 1949 |
| 2,636,290 | Bell | Apr. 28, 1953 |
| 2,790,365 | Bunting | Apr. 30, 1957 |
| 2,883,777 | Gurries et al. | Apr. 28, 1959 |
| 2,884,907 | Atchley | May 5, 1959 |
| 2,941,319 | Beemer et al. | June 21, 1960 |
| 2,965,990 | Colee | Dec. 27, 1960 |
| 2,971,499 | Curlett | Feb. 14, 1961 |

FOREIGN PATENTS

| | | |
|---|---|---|
| 1,030,261 | Germany | May 14, 1958 |